June 4, 1968

E. C. RUSSELL 3,386,189

EDUCATIONAL DEVICE

Filed Sept. 26, 1966

INVENTOR.
EUNICE C. RUSSELL
BY

*Learman, Learman & McCulloch*

ATTORNEYS

June 4, 1968  E. C. RUSSELL  3,386,189
EDUCATIONAL DEVICE

Filed Sept. 26, 1966  2 Sheets-Sheet 2

INVENTOR.
EUNICE C. RUSSELL
BY
*Learman, Learman & McCulloch*
ATTORNEYS

United States Patent Office 3,386,189
Patented June 4, 1968

3,386,189
EDUCATIONAL DEVICE
Eunice C. Russell, 10670 Dixie Highway,
Birch Run, Mich. 48415
Filed Sept. 26, 1966, Ser. No. 582,128
10 Claims. (Cl. 35—31)

This invention relates to an educational device and more particularly to a device which is especially adapted to afford entertainment to children while simultaneously teaching them rote counting, number recognition and the correlation of numbers to a corresponding number of symbols.

Devices of the general class to which the invention pertains have been proposed heretofore, but in the main have been of rather limited scope, too complex for very young children, or both. Moreover, most of the known devices have necessitated a child's having some prior knowledge of numbers in order to operate the device.

An object of this invention is to provide a device of the character described and which overcomes the disadvantages of previously known devices.

Another object of the invention is to provide an educational device which is capable of use by children having no prior knowledge of numbers, but which is effective to teach them not only rote counting and number recognition, but also correlation of numbers and objects.

A further object of the invention is to provide a device of the kind referred to and wherein the device requires manipulation of such kind as to assist in developing the small muscles of a child's hand which are necessary for writing.

Another object of the invention is to provide an educational device having the characteristics mentioned and which affords a challenge and a goal in satisfaction of the challenge and which further relies upon the principle of repetition as a primary teaching technique.

Other objects and advantages of the invention will be pointed out in detail or will become apparent from the following description when it is considered in conjunction with the appended claims and the accompanying drawings, in which:

Figure 1:
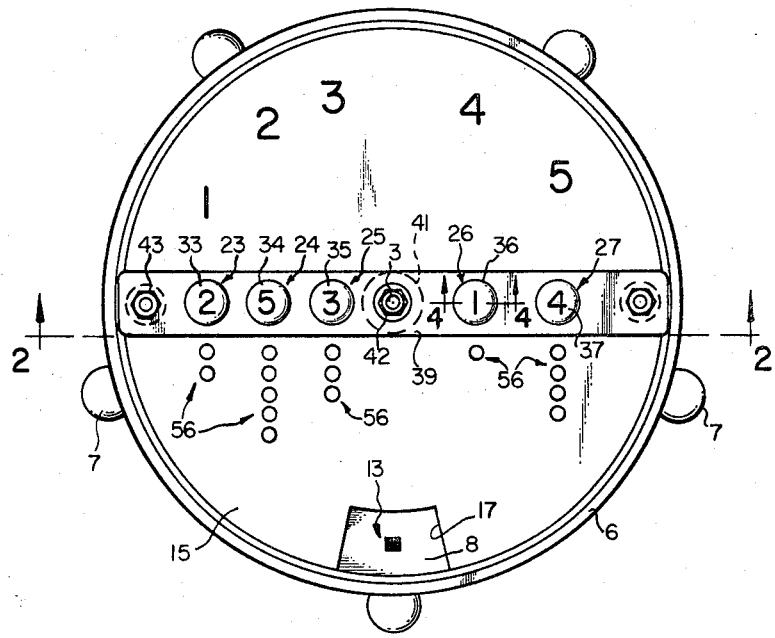
FIGURE 1 is a top plan view of a device constructed in accordance with the invention.

Apparatus constructed in accordance with the invention comprises a support or base member 1 which preferably, but not necessarily, is disk-shaped and has a plurality of rubber or similar protective, nonskid feet 2 secured to the lower surface of the base 1. Fixed to the base 1 and projecting upwardly from the latter is a spindle 3 which forms an axis of rotation for a purpose presently to be explained.

Rotatably journaled on the spindle 3 by means of a bushing 3a is an intermediate disk 4 to the lower surface of which is secured a plate 5 having an upstanding, peripheral flange 6 to the periphery of which is secured a plurality of knobs or handles 7 by means of which the member 4 may be rotated about the axis of the spindle. The bushing 3a extends above the upper surface of the member 4 for a purpose presently to be explained. The member 4 is provided on its upper surface with a plurality of zones 8, 9, 10, 11 and 12. Each zone is provided with a symbol 13 which differs from each other symbol. As illustrated, each symbol 13 comprises one or more rectangular dots, the zone 8 having one dot, the zone 9 having two dots, the zone 10 having three dots, and so on. The symbols 13 needs not necessarily be dots, but could be pictures of animals, toys, or any other object. The number of zones provided will depend upon the size of the device. Thus, although there are five zones provided in the apparatus disclosed herein, there may be more or fewer zones, as desired.

Fixed on the spindle 3 in overlying relation to the disk 4 is a subsantially disk-shaped member 15 to the lower surface of which is fixed a metal or other hard surface plate 16. At the periphery of the members 15 and 16 is an opening 17 of such size as to correspond to the size of any one of the zones 8–12 so as to enable visual access to be had to any one zone. The member 15 rests atop the bushing 3a so as to provide a space S between the members 4 and 15.

Figure 2:
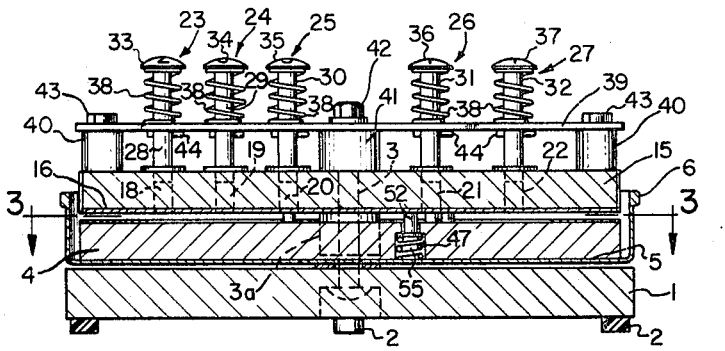
FIGURE 2 is a transverse sectional view taken on the line 2—2 of FIGURE 1.
Figure 3:
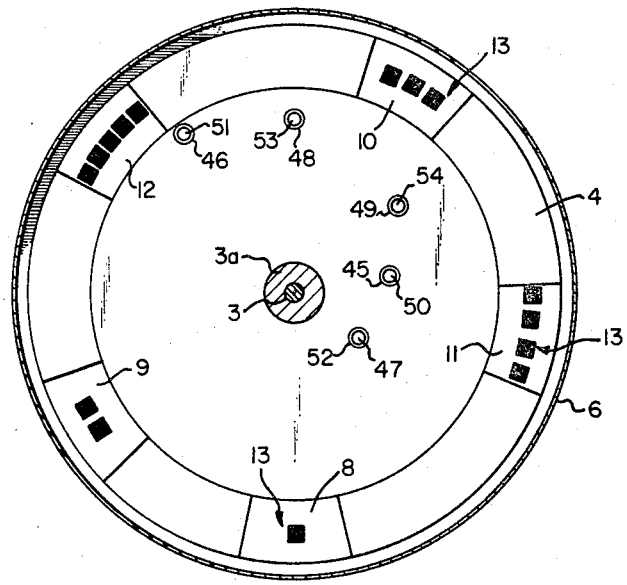
FIGURE 3 is a sectional view taken on the line 3—3 of FIGURE 2.

As is best shown in FIGURE 2, the members 15 and 16 are provided with five aligned sockets or bores 18, 19, 20, 21 and 22 which are arranged diametrally of the member 15, but the radial distance from the axis of the spindle 3 to each bore is different. Associated with each of the bores 18 is a latch release member, the number of such members corresponding to the number of bores. Thus, there are five latch release members 23, 24, 25, 26 and 27 in the disclosed embodiment. The member 23 has a shank 28 that is received in the bore 18, the member 24 has a shank 29 accommodated in the bore 19, and the members 25, 26 and 27 have shanks 30, 31 and 32, respectively, which are accommodated in the bores 20, 21 and 22. The upper end of the shank 28 is provided with a cap 33, the upper end of the shank 29 is provided with a cap 34, and the upper ends of the shanks 30–32 are provided with similar caps 35–37, respectively. A spring 38 is in surrounding relation with each of the shanks and reacts between the associated cap and a transverse bar 39 which is mounted at its opposite ends on the member 15 by posts 40 and by a central post 41 through which the spindle 3 extends. A nut 42 secures the bar 39 to the post 41 and also maintains the members 1, 4 and 15 assembled. Screws 43 secure the opposite ends of the bar 39 to the posts 40.

As is illustrated in FIGURE 2, the springs 38 normally maintain the respective members 23–37 in an elevated position in which the lower ends of the respective shanks are received in, but do not extend through, the associated bores 18–22. A pin 44 secured to the shank of each latch release member for engagement with the lower surface of the bar 39 limits upward movement of each of the latch release members so as to prevent their inadvertant removal from the associated bores.

The intermediate member 4 is provided with a plurality of shouldered openings 45, 46, 47, 48 and 49 corresponding in number to the number of zones 8–12 and to the number of latch release members 23–27. The shouldered openings, however, are arranged substantially spirally about the axis of the spindle 3 and at radial distances therefrom corresponding to the radii of their respective latch release members 23–27. Mounted in the opening 45 is a shouldered latch pin 50, mounted in the opening 46 is a similar shouldered latch pin 51, and mounted in each of the other openings 47–49 is a similar shouldered latch pin 52–54, respectively. Each of the shouldered pins is biased by a spring 55 toward the overlying member 15 and each pin is of such length as to be capable of being projected into the associated opening in the member 15. Due to the spiral arrangement of the pins 50–54, however, only one pin may be accommodated in a bore in the member 15 at any one time.

Each of the caps 33–37 is provided with an identifying numeral corresponding to the number of symbols displayed in one of the zones 8–12. The numerals are not arranged seriatim from left to right, however, but are arranged in what appears to be a haphazard manner. Thus, the cap 33 has the numeral 2, the cap 34 has the numeral 5, the cap 35 has the numeral 3, the cap 36 has the numeral 1 and the cap 37 has the numeral 4. Adjacent each of the members 23–27 the upper surface of the member 15 is provided with indicia specifically different from the symbols 13, but corresponding in number to the numeral provided on each of the caps 33–37. Thus, adjacent the cap 33 the indicia 56 comprises two circular dots, adjacent the cap 34 the indicia 56 comprises five circular dots, and so on.

In the operation of the apparatus, assume that the members 4 and 15 are so arranged that the opening 17 in the member 15 overlies the zone 8 so as to provide visual access to the single dot symbol 13. In these positions of the parts, the latch pin 50 will be projected through the space S between the members 4 and 15 so as to be accommodated in the bore 21. As long as the pin 50 remains in the bore 21, it will be impossible to rotate the member 4.

Figure 4:
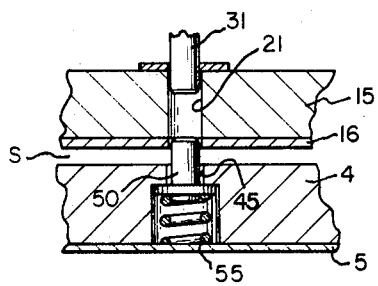
FIGURE 4 is a fragmentary, enlarged, sectional view taken on the line 4—4 of FIGURE 1 and illustrating parts of the apparatus in one relative position of adjustment.
Figure 5:
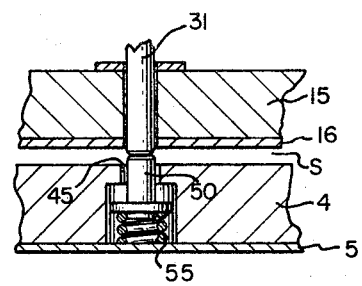
FIGURE 5 is a view similar to FIGURE 4 but illustrating the parts in another relative position of adjustment.

To remove the pin 50 from the bore 21, it is necessary that the member 26 be depressed so as to effect movement of the shank 31 from the position shown in FIGURE 4 to the position shown in FIGURE 5 in which the abutting ends of the members 31 and 50 lie in the space S between the members 4 and 15. The cap 36 and the spring 38 react with the bar 39 to prevent or limit movement of the free end of the shank 31 beyond the space S. In these positions of the parts, the member 4 may be rotated by means of one of the handles 7. In order to determine which of the latch release members 23–27 must be operated to permit rotation of the member 4, however, it is necessary for the operator to correlate the symbol 13 shown in the visible zone 8 with the corresponding indicia 56 and with the numeral displayed on the corresponding latch release member. That is, the operator must associate the single symbol 13 with the single dot indicia 56 and with the numeral 1.

After the latch pin 50 has been removed from the bore 21, the member 4 may be rotated in either direction. If the member 4 is rotated clockwise, for example, the latch pin 54 will be rotated to a position in which it may be projected by its spring 55 into the bore 22, thereby latching the member 4 in a position in which the zone 11 appears under the opening 17 so as to provide visual access to the four dot symbol 13. To effect movement of the member 4 from this position, it is necessary for the operator to depress the latch release member 27, thereby removing the associated latch pin 54 from the bore 22, whereupon the member 4 once again is free to be rotated in either direction.

An important characteristic of the apparatus is that the angular spacing between adjacent latch pins corresponds to the angular spacing between adjacent symbol zones. In such an arrangement the rotatable member 4 cannot fail to be latched in a position in which one of the sets of symbols will be visible.

The operating procedure may be repeated as many times as is desired, but at any time any one of the latch pines 50–54 registers with one of the bores 18–22, the members 4 and 15 will be latched against relative rotation and it will be necessary for the operator to determine which of the latch release members must be operated to effect release of the members 4 and 15.

The disclosed embodiment is representative of a presently preferred form of the invention, but is intended to be illustrative rather than definitive thereof. The invention is defined in the claims.

I claim:

1. An educational device comprising first and second overlying members; means mounting said members for relative rotation; a plurality of latch members mounted on one of said members; means biasing said latch members toward the other of said members; a plurality of sockets in said other of said members corresponding to the number of latch members and so arranged relatively thereto that only one of said latch members may be received in a socket at any one relative position of said members; and latch release means carried by the other of said members and operable to remove said one latch member from its associated socket whereby said first and second members may be rotated relatively to one another.

2. A device according to claim 1 wherein said sockets are arranged substantially diametrically of said other member and wherein said latch members are arranged substantially spirally of said one member.

3. A device according to claim 1 wherein said latch release means has individual identifying indicia thereon, the lower one of said relatively rotatable members has symbols thereon related to the indicia of said latch release means, and the upper one of said relatively rotatable members has an opening therein to provide visual access to a selected one of said symbols.

4. A device according to claim 3 wherein the arrangement of said latch release means and said sockets is so related to said indicia and to said symbols that the symbol visually accessible through said opening indicates the latch release means which must be operated to enable relative rotation of said first and second members.

5. The device according to claim 1 including means interposed between said first and second members to provide a space therebetween, and wherein said latch release means is movable toward said second member a distance such as to project into said space.

6. The device according to claim 5 including limit means acting on said latch release means to preclude movement thereof in said direction beyond said space.

7. An educational device comprising a first member; means mounting said first member for rotation about an axis; a second member overlying said first member and mounted for rotation relative to said first member about said axis; a plurality of latch members carried by said first member and arranged substantially spirally about said axis; means biasing each of said latch members toward said second member; a plurality of sockets in said second member arranged substantially diametrally, each of said sockets being so spaced from said axis as to be capable of receiving one of said latch members; a plurality of latch release members corresponding to the number of said sockets; and means mounting said latch release members one in each of said sockets for movement toward said first member of distance such as to remove the associated latch member from the opening in said second member.

8. A device according to claim 7 wherein each of said latch release members has identifying indicia associated therewith, the lower one of said overlying members has symbols thereon related to the indicia of said latch members, and the upper one of said overlying members has an opening therein to provide visual access to said symbols.

9. A device according to claim 4 wherein the arrangement of said latch release members and said sockets is so related to said indicia and to said symbols that the symbol visually accessible through said opening indicates the latch release members which must be operated to enable relative rotation of said first and second members.

10. The device according to claim 7 including means interposed between said first and second members to provide a space therebetween, and wherein said latch release member is movable toward said second member a distance such as to project into said space.

References Cited

UNITED STATES PATENTS

| | | | |
|---|---|---|---|
| 2,591,327 | 4/1952 | Witter et al. | 35—9 |
| 3,230,642 | 1/1966 | Goldschmidt | 35—9 |
| 3,343,278 | 9/1967 | Jermundson | 35—9 |

EUGENE R. CAPOZIO, *Primary Examiner.*

W. GRIEB, *Assistant Examiner.*